(12) United States Patent
Reaves et al.

(10) Patent No.: US 6,471,865 B1
(45) Date of Patent: Oct. 29, 2002

(54) SOLVENT EXCHANGE COLUMN AND A METHOD OF USE THEREFOR

(75) Inventors: J. Todd Reaves, Mobile, AL (US);
Aron T. Griffith, Humble, TX (US);
Jose M. Sosa, Deer Park, TX (US);
Douglas Berti, Nassau Bay, TX (US);
Brad Klussmann, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 20 days.

(21) Appl. No.: 09/696,041

(22) Filed: Oct. 25, 2000

(51) Int. Cl.[7] ................................................ B01D 11/04
(52) U.S. Cl. ........................ 210/634; 210/175; 210/188;
210/511; 210/774; 202/158; 203/9; 261/128;
525/53; 525/316; 526/83
(58) Field of Search ................................. 210/175, 194,
210/511, 634, 774, 805, 188; 202/152,
158, 266, 270; 203/9; 422/131, 134, 136;
525/53, 316; 526/67, 68, 70, 83; 261/128

(56) References Cited

U.S. PATENT DOCUMENTS

| | | | | |
|---|---|---|---|---|
| 3,448,015 A | * | 6/1969 | Rogers | |
| 3,717,553 A | * | 2/1973 | Otsuki et al. | 202/158 |
| 4,039,389 A | * | 8/1977 | Christman | |
| 4,272,344 A | * | 6/1981 | Watson | 203/9 |
| 4,315,801 A | * | 2/1982 | Winter | 210/511 |
| 4,468,343 A | * | 8/1984 | Butler et al. | 526/83 |
| 4,777,210 A | * | 10/1988 | Sosa et al. | 525/53 |
| 5,393,429 A | * | 2/1995 | Nakayama et al. | 210/634 |
| 5,500,116 A | * | 3/1996 | Nakayama et al. | 210/511 |
| 5,527,511 A | * | 6/1996 | Sosa et al. | 422/131 |
| 6,143,833 A | * | 11/2000 | Klussman et al. | 525/316 |

* cited by examiner

Primary Examiner—Joseph W. Drodge
(74) Attorney, Agent, or Firm—Hitt, Gaines & Boisbrun, P.C.; Bradley A. Misley

(57) ABSTRACT

The present invention provides a solvent exchange column for continuously exchanging styrene monomer with the solvent used to produce polybutadiene and a method of use therefor. The solvent exchange column includes an exchange plate support structure coupled to and supporting spaced apart exchange plates, wherein each of the exchange plates has holes located therein to allow a passage of fluid therethrough. The solvent exchange column further includes a vapor ventilation system for allowing the volatized solvent to exit the solvent exchange column.

28 Claims, 8 Drawing Sheets

SOLVENT EXCHANGE COLUMN AND A METHOD OF USE THEREFOR

TECHNICAL FIELD OF THE INVENTION

The present invention is directed, in general, to the production of rubber-modified monovinyl aromatic polymers, and more specifically, to a solvent exchange column and method of using the solvent exchange column in the production of rubber-modified monovinyl aromatic polymers.

BACKGROUND OF THE INVENTION

Methods and apparatus for continuously producing polybutadiene and for producing high impact polystyrene using polybutadiene as the rubber component, are both well known. The solution of polymerization of butadiene to polybutadiene in a hydrocarbon solvent is disclosed, for example in U.S. Pat. Nos. 4,271,060; 4,375,534; 4,495,028; and 4,686,086. According to conventional methods, polybutadiene is made by polymerizing butadiene to about 12 weight percent solids in hexane, butane, cyclopentane, or another hydrocarbon solvent; concentrating the mixture to about 30 weight percent solids by flashing off solvent; steam stripping to remove additional solvent, reduce stickiness and precipitate the crumb rubber; squeezing and drying to remove excess moisture; and agglomerating the dried crumb rubber by the addition of heat to produce regularly shaped bales. The baled rubber is then sent to intermediate storage or transported to plant sites for use in making other products such as rubber-modified polymers.

One widely used rubber-modified polymer is high impact polystyrene (HIPS). HIPS is made by polymerizing styrene monomer having dissolved in it from about 4 to about 15 percent by weight styrene-butadiene rubber (SBR) or polybutadiene rubber. Both are commonly produced with Mooney viscosities of either 35 or 55, and polybutadiene is generally less expensive than SBR. A conventional method for making HIPS using polybutadiene is disclosed, for example, in U.S. Pat. No. 4,777,210.

In certain applications, it may be advantageous to replace bales of polybutadiene with a continuous polybutadiene/styrene mixture that can be fed directly to a conventional HIPS production line, which can substantially reduce the labor, equipment, transportation, storage and energy costs typically associated with the use of polybutadiene bales. In such systems, butadiene is dissolved in an appropriate solvent, after which a catalyst is added to cause the butadiene to polymerize and form a rubber solution. The rubber solution solvent is then exchanged with styrene in a front-end process to form a polybutadiene/styrene feed mixture. This polybutadiene/styrene feed mixture is then transferred to the HIPS plant for conversion to a high impact polystyrene. A significant problem may arise in such systems, however. In order to dissolve the butadiene, a hydrocarbon solvent such as hexane or butane is added. The use of such solvents, however, may significantly reduce polystyrene production rates due to the inert characteristics of the solvents. Thus, in these continuous feed systems, it would be highly desirable to remove as much of the solvent as possible from the front-end process.

Accordingly, what is needed in the art is an apparatus for exchanging the hydrocarbon diluent with a monovinyl aromatic polymerizable monomer and a method of making a high impact polystyrene using such an apparatus.

SUMMARY OF THE INVENTION

To address the above-discussed deficiencies of the prior art, the present invention provides a solvent exchange column for continuously exchanging styrene monomer with the solvent used to produce polybutadiene and a method of use therefor. The solvent exchange column includes an exchange plate support structure coupled to and supporting spaced apart exchange plates, wherein each of the exchange plates has holes located therein to allow a passage of fluid therethrough. The solvent exchange column further includes a vapor ventilation system that extends through the solvent exchange column and allows a volatilized substance to pass therethrough. In addition, in a preferred embodiment, the vapor ventilation system may also provide an overflow port to further prevent a substantial build-up of fluid on the exchange plates.

Another aspect of the present invention provides a method for using the solvent exchange column. The method, in one exemplary embodiment, may include (1) passing a mixture, including a solvent, through exchange plates of a solvent exchange column, the exchange plates having holes located therein to allow a passage of mixture therethrough, (2) volatilizing a substantial portion of the solvent from the exchange plates, and (3) venting a substantial portion of the solvent through a vapor ventilation system of the solvent exchange column.

An alternative aspect of the present invention provides a system for preparation of a rubber-modified monovinyl aromatic polymer. The system, may include a reactor for forming a mixture of a monovinyl aromatic monomer, an unsaturated hydrocarbon polymer having the general formula $C_nH_{2n-2}$ and a solvent, the solvent exchange column described above coupled to the reactor, and a styrene polymerization reactor coupled to the solvent exchange column.

The solvent exchange column and method of use therefor, and the system for preparation of a rubber-modified monovinyl aromatic polymer, are believed to be useful for easily and inexpensively producing HIPS containing high-quality polybutadiene rubbers. Of equal importance, is the ability to do this while obtaining the highest production rate of polystyrene as possible. To obtain such high rates, it is important to remove as much of the solvent as possible, that is used to polymerize the butadiene. The solvent exchange column, as provided by the present invention, is capable of recovering substantial amounts of the solvent and, consequently, provides a purer feed for the HIPS plant from which increased production rates of high impact polystyrene may be obtained. Those knowledgeable in the art will recognize the fact that polybutadiene solutions in hydrocarbon solvents are very viscous solutions capable of forming crosslinked polymers at certain temperatures; thus, the solvent exchange column incorporates a novel design to prevent gelation during the solvent exchange operation and homopolymerization of styrene.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
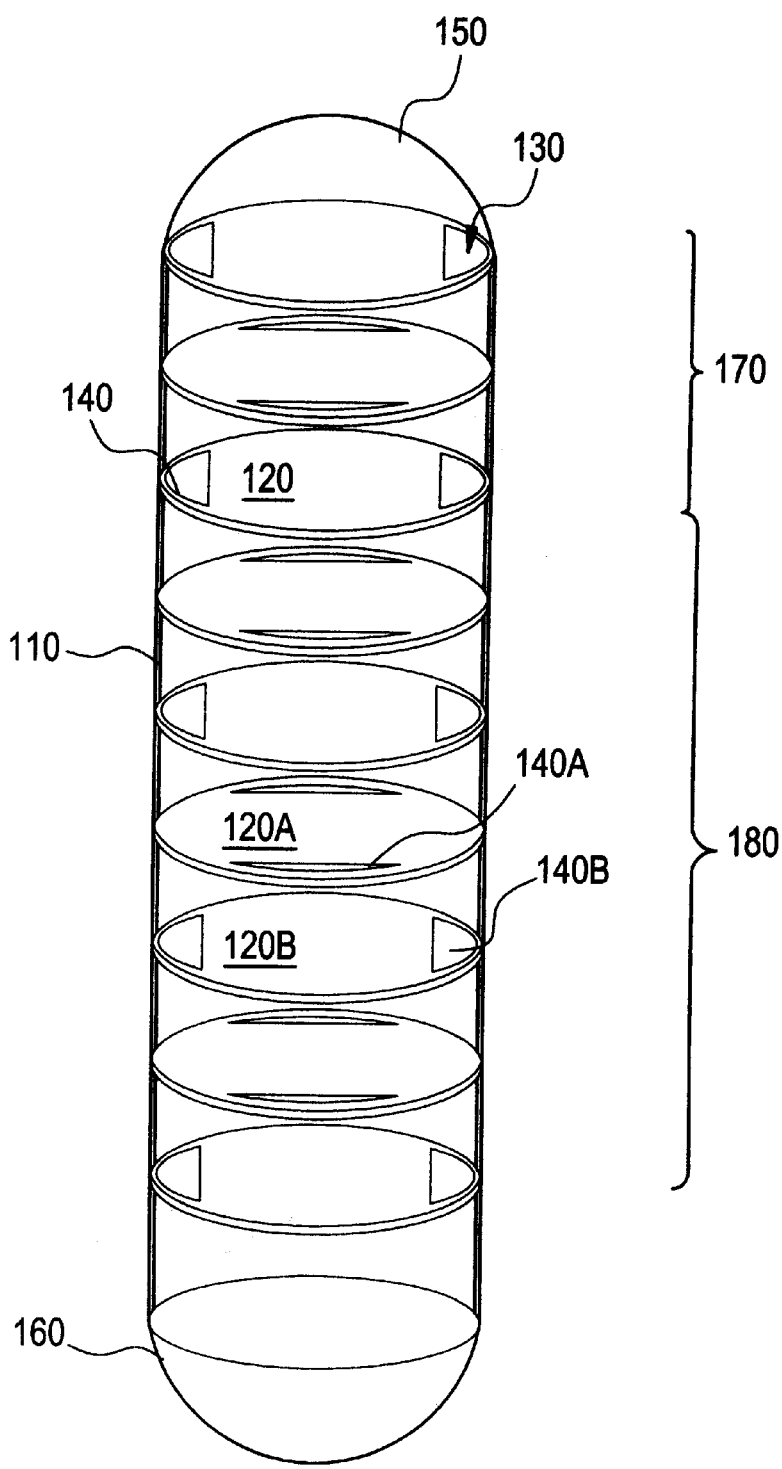
FIG. 1 illustrates a three dimensional representation of a solvent exchange column.

Referring initially to FIG. 1, illustrated is a preferred embodiment of a three dimensional representation of a solvent exchange column 100 as provided by the present invention. The illustrated solvent exchange column 100, in one particularly advantageous embodiment, may be used in a conventional high impact polystyrene (HIPS) plant to remove undesirable solvents, such as inert solvents (e.g., butane and hexane), which can interfere with polystyrene production rates within the HIPS plant. The solvent exchange column 100 illustrated in FIG. 1 includes an exchange plate support structure 110 designed to support and space apart exchange plates 120. In one embodiment of the invention, the exchange plate support structure 110 includes exchange plate support structure clips 100a for supporting and spacing apart the exchange plates 120. The illustrated exchange plate support structure 110 also includes an external vessel (not shown), which encapsulates the exchange plates 120 and funnels a fluid, such as a polybutadiene/styrene/hexane feed mixture, through the exchange plates 120. In this particular instance, the external vessel is not illustrated so that the inside elements of the solvent exchange column 100 may be observed.

One having general knowledge in the art understands that the exchange plate support structure 110, including the external vessel, the exchange plates 120 and any other feature located within the solvent exchange column 100, may be manufactured from a corrosion resistant material suitable for, but not limited to, petrochemical use. In one exemplary embodiment, the solvent exchange column 100, and all features located therein, are manufactured from carbon steel. In another embodiment, the external vessel is manufactured to have a pressure rating of greater than about 50 pounds per square inch/FV and a temperature rating of greater than about 250° F. The pressure and temperature ratings are important features due to the high temperatures and pressures needed to remove the undesirable solvents from the fluid.

The solvent exchange column 100 further includes a vapor ventilation system 130. The vapor ventilation system 130 is specifically designed to allow the volatized solvent to exit the solvent exchange column 100 during the separation of the solvent from the fluid. In one unique aspect, the vapor ventilation system 130 includes vapor flow vents 140, which are discussed in more detail below and which may serve as overflow ports to prevent excess build-up of the fluid on the plate. As illustrated in FIG. 1, vapor flow vents 140A of a given exchange plate 120A are preferably positioned in an offset relationship with respect to vapor flow vents 140B located in an adjacent exchange plate 120B. More specifically, as one traverses down the solvent exchange column 100 from top to bottom, the vapor flow vents 140 are offset by about 90° from the previous vapor flow vent 140. Since the vapor flow vents may be offset by 90°, any fluid that might escape through one particular vapor flow vent 140 would be required to pass through the exchange plate 120 located therebelow, rather than another vapor flow vent 140.

Also illustrated in the solvent exchange column 100 are an optional top dome 150 nand bottom dome 160. The top and bottom domes 150, 160, may be removably coupled to the exchange plate support structure 110, including the external vessel, to complete the solvent exchange column 100. In one advantageous embodiment, the fluid may enter through a nozzle (not shown) manufactured in the top dome 150 nand the fluid may exit through a nozzle (not shown) manufactured in the bottom dome 160. However, in another embodiment, the fluid may enter through a pipe (not shown) located in the upper portion of the external vessel and the fluid may exit through a pipe (not shown) located in the lower portion of the external vessel. Similar to above, the top dome 150, bottom dome 160, nozzles, and pipes, should be manufactured from a corrosion resistant material suitable for, but not limited to, petrochemical use.

In one preferred embodiment, the solvent exchange column 100 may be separated into multiple regions, each region having varying number of exchange plates 120. Moreover, the exchange plates in one region could have a different number of holes, and diameters of such holes, than an exchange plate 120 in another region. The benefit of creating separate regions, results from the ability to customize the exchange plates 120, within each region, for optimal performance. Typically, the holes located within an exchange plate 120 in an upper region will be smaller than the holes located within an exchange plate 120 in a lower region, since the viscosity of the fluid typically increases as it approaches the bottom of the solvent exchange column 100. Thus, typically the upper region, as a whole, can have a surface area greater than the lower region.

In the particular embodiment illustrated in FIG. 1, the solvent exchange column 100 is separated into a first solvent exchange region 170 and a second solvent exchange region 180. Preferably, the entire first solvent exchange region 170 has a surface area greater than the entire second solvent exchange region 180. In another embodiment, each individual exchange plate 120 that comprises the first solvent exchange region 170 has a surface area greater than each individual exchange plate 120 that comprises the second solvent exchange region 180. However, it should be noted that it is not necessary that the first solvent exchange region 170 have a combined surface area that is greater than the combined surface area of the second solvent exchange region 180. For example, the surface area of one of the exchange plates 120 within the first solvent exchange region 170 may have a surface area that is less than a surface area of any one of the exchange plates 120 comprising the second solvent exchange region 180. Thus, one having skill in the art should understand that the number of regions, number of exchange plates 120 within each region, and the specific surface area design of each exchange plate 120, within each region, may vary depending on various design requirements.

Figure 2A:
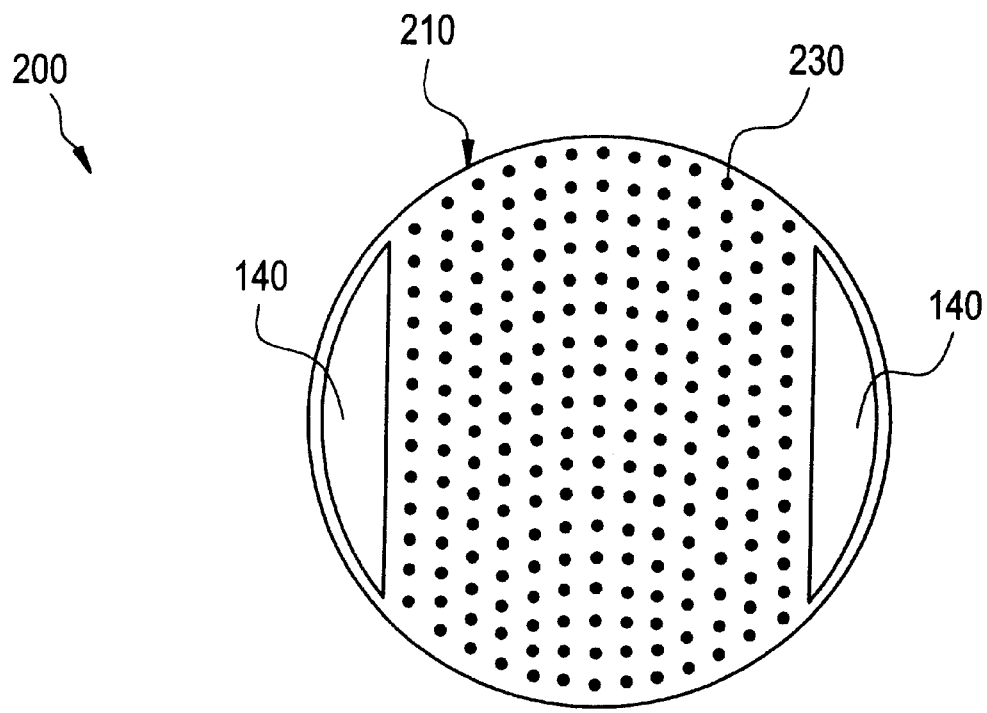
FIGS. 2A–2D illustrate top down views of various exchange plate configurations, including an upper exchange plate and a lower exchange plate.
Figure 2B:
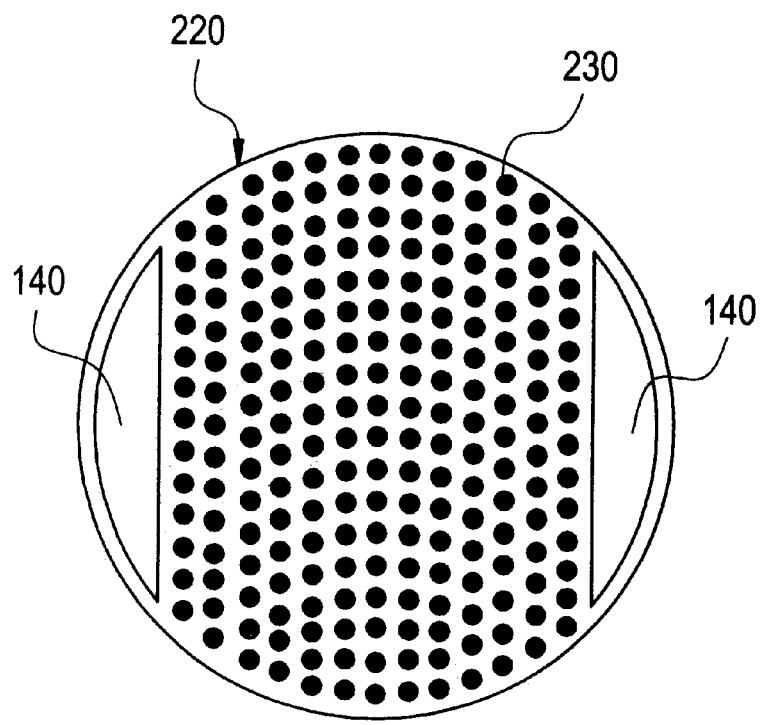

Turning to FIGS. 2A and 2B, with continued reference to FIG. 1, illustrated are detailed top down views of various exchange plate configurations, including an upper exchange plate 210 and a lower exchange plate 220. As illustrated, both the upper exchange plate 210 and the lower exchange plate 220 have holes 230 located therein that allow a passage of fluid therethrough. The number of holes 230, spacing of the holes 230 and pitch of the holes 230, will be discussed in more detail below. As seen from these illustrative embodiments, the upper exchange plate 210 has a surface area that is greater than a surface area of the lower exchange plate 220. Thus, as discussed above, the upper exchange plate 210, in a preferred embodiment, may comprise a portion of the first solvent exchange region 170.

In another embodiment, the upper and lower exchange plates 210, 220 do not have a ledge or wall extending up from and around the plates 210, 220, like those typically found in conventional columns. In other words, the exchange plates 210, 220 are preferably weirless. However, other embodiments may provide a very shallow wall, but in such embodiments, the wall should not have a height that allows a substantial amount of fluid to build up on the plate to the point that there is not an efficient removal of the liquid from the plate. This particular embodiment is in contrast to conventional columns where the weirs are necessary to maintain a substantial fluid level on the plate so that gas can be passed through the fluid and effect the desired chemical separation. In the present invention, however, a substantial build-up of fluid is undesirable because it can promote polymerization of the monomer and gelation of the rubber. In the illustrative embodiments shown in FIGS. 2A & 2B, the upper and lower exchange plates 210, 220, include the vapor flow vents 140 located therein. As previously mentioned, the vapor flow vents 140 may also serve as overflow ports, and are specially designed to allow the fluid to overflow to lower exchange plates. In one particularly advantageous embodiment illustrated in FIGS. 2A and 2B, the vapor flow vents 140 form a part of the exchange plates 210, 220 and are located on opposing sides of the upper and lower exchange plates 210, 220. However, one having skill in the art knows that the present invention is not limited to this design, and that a single overflow vent 140 could be located adjacent a side of each of the upper and lower exchange plates 210, 220.

Figure 2C:
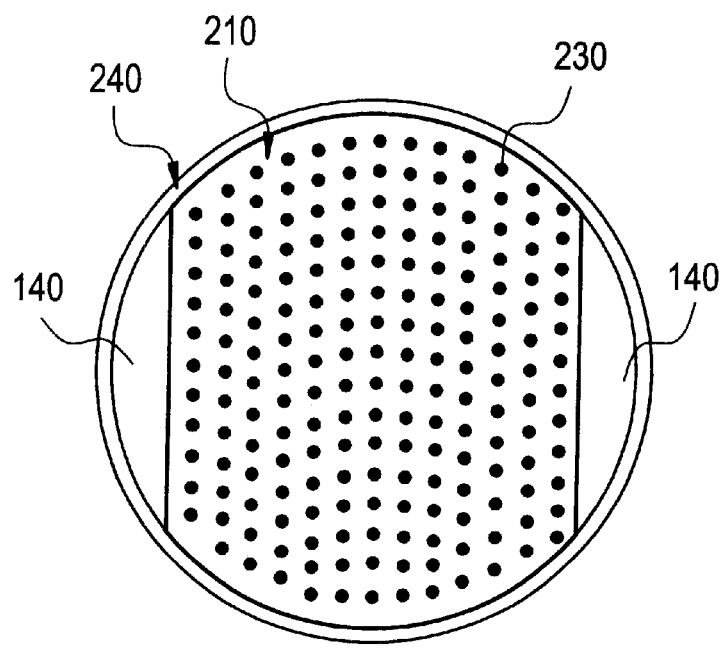
Figure 2D:
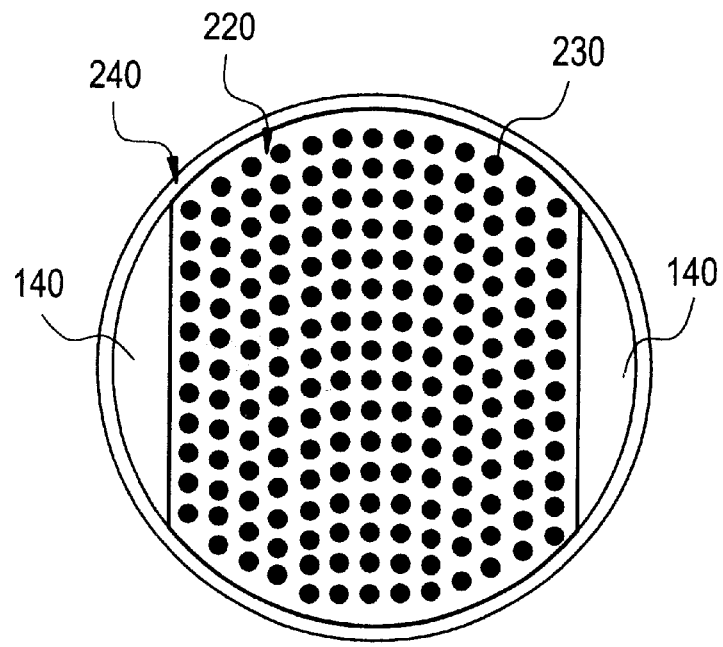

In another exemplary embodiment depicted in FIGS. 2C and 2D, the vapor flow vents 140 do not form a part of the upper and lower exchange plates 210, 220, but are located on opposing sides of each of the upper and lower exchange plates 210, 220. In the illustrative embodiment, the vapor flow vents 140 may be manufactured into a part of the exchange plate support structure 240, which forms a portion of the exchange plate support structure 110 illustrated in FIG. 1. In such an embodiment, the upper and lower exchange plates 210, 220, removably fit within that part 240. The vapor flow vents 140, whether located within the upper and lower exchange plates 210, 220, or located adjacent the upper and lower exchange plates 210, 220 may, in certain embodiments, comprise a portion of the vapor ventilation system 130 illustrated in FIG. 1.

The actual design of the solvent exchange column 100, and its elements, plays an important role in how effective and efficient the solvent exchange column 100 operates. FIG. 1 illustrates a nine stage solvent exchange column 100, wherein each stage is represented by a exchange plate 120. One having skill in the art should understand that the number of stages within the solvent exchange column 100, height of the solvent exchange column 100, diameter of the solvent exchange column 100, number of holes 230 within each exchange plate 120 and the diameter of such holes 230, may be varied and manufactured to provide the most efficient solvent exchange column 100 possible. In a preferred embodiment of the invention, however, the solvent exchange column 100 is designed to remove at least about 99% of the solvent from the fluid passed through the solvent exchange column 100.

The exchange plates 120 are one particularly advantageous design feature. In essence, each exchange plate 120 may be designed to reduce fluid buildup by eliminating any exchange plate component that may cause dead spots. For example, the number of holes 230 and the diameter of each hole 230 can be altered to reduce dead spots. Even though the number of holes 230 is important, the hole 230 diameter generally governs each exchange plate's efficiency and the overall solvent exchange column diameter. For instance, the separation efficiency generally increases as the surface area to volume ratio increases, which may be increased by using smaller holes.

Figure 3:
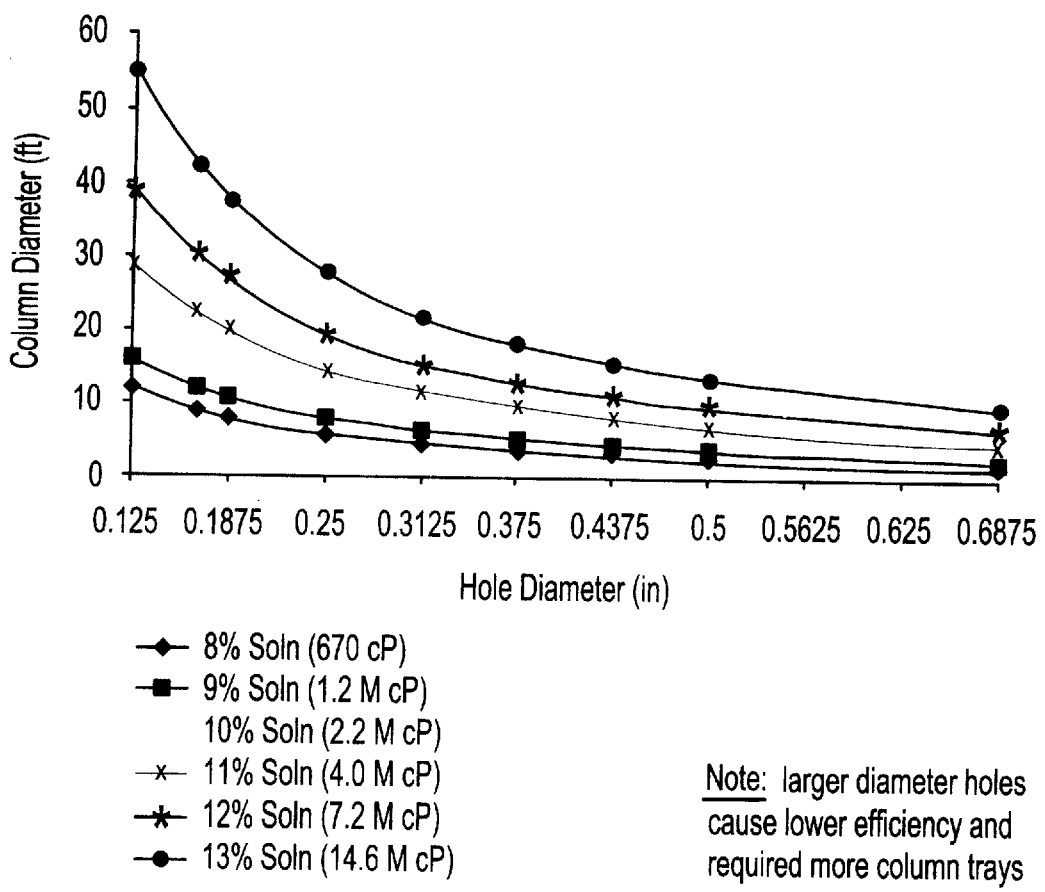
FIG. 3 illustrates a graph of the column diameter required to achieve a desired efficiency, given a predetermined hole diameter.
Figure 4A:
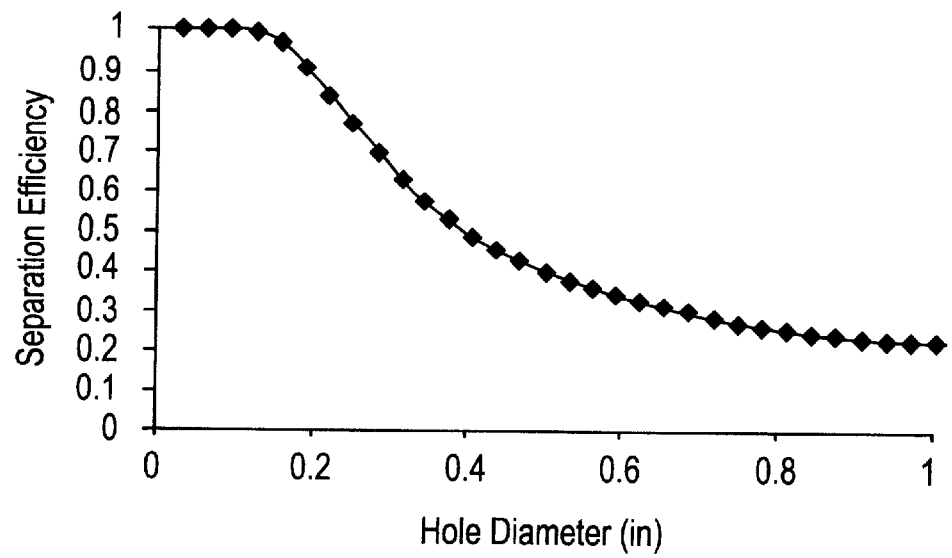
FIGS. 4A and 4B illustrate plots of the separation efficiency as a function of hole diameter for rectangular and spherical coordinates, respectively.
Figure 4B:
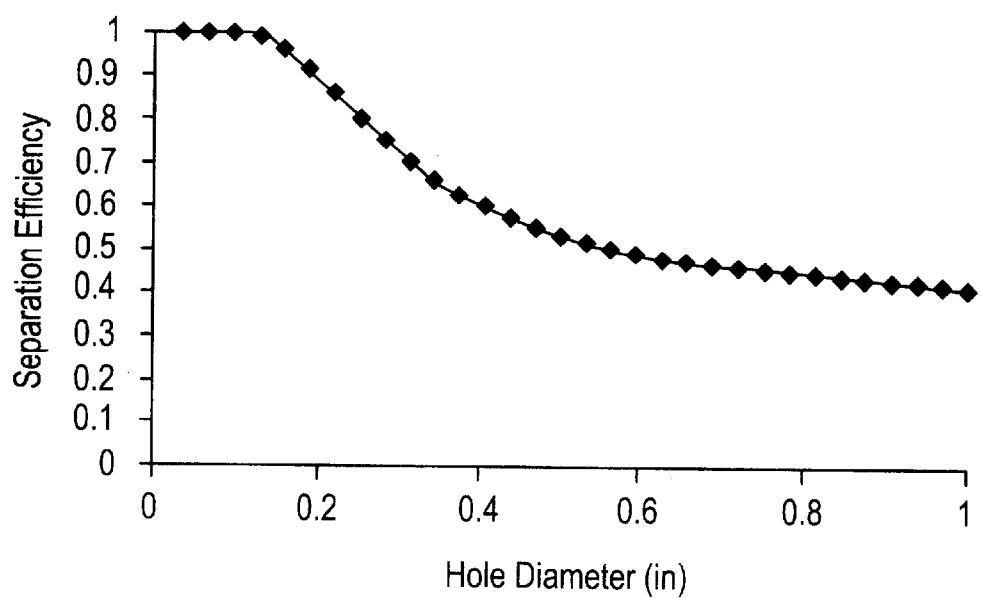

Turning briefly to FIGS. 3–4B, illustrated are various graphs demonstrating the effects of varying the diameter of the holes 230. FIG. 3 illustrates the column diameter required given a predetermined hole diameter to achieve a desired efficiency. As evidenced by FIG. 3, the larger diameter holes cause lower efficiency and in turn require more column trays. For a lower separation efficiency, more trays are required to perform the same degree of separation. The relation between the actual separation efficiency ($E_f$), the required separation efficiency ($E_f^*$), and the required number of stages (n) to achieve the same separation as with one stage of the required separation efficiency, is given in the following equation:

$$n = \frac{\ln(1 - E_f^*)}{\ln(1 - E_f)}$$

FIGS. 4A & 4B illustrate a plot of the separation efficiency as a function of hole 230 diameter for rectangular and spherical coordinates, respectively. As illustrated, the spherical coordinate equations yield higher separation efficiencies for the same hole 230 diameter, than the rectangular coordinate equations. For example, for $11/16$ inch diameter tray holes, the separation efficiency is preferably between about 48% (spherical) and about 32% (rectangular). For each commercial column stage that is designed with $11/16$ inch holes, 3.5 (spherical) to 6 (rectangular) times the number of trays would be required.

In a preferred embodiment of the column 100, the minimum number of holes to overcome the tray pressure drop was calculated from known equations. Because the viscosity increases in the bottom of the column 100, larger diameter holes can be used to limit the column size. Also, smaller vapor vents may be required in the bottom of the column 100 since there is less vapor flow. In a noncommercial scale where the feed rate and composition is 2.1 lb per hr, 4.8% polybutadiene, 38% hexanes and 57.2% styrene, the column 100 preferably is a minimum of about 10 inches in diameter and may have a length of about 23 feet. However, it should be understood that the column's 100 diameter may depend on the design viscosity. For example, if a maximum design viscosity of 10,000 cP for the three bottom most trays is desired, the design viscosity requires 1,160 $3/16$ inch holes, which results in a 16 inch diameter tray. Preferably, the column 100 has nine trays where the top six trays have about 1200 $1/8$ inch diameter holes and a vent width of about 2 inches. The bottom three trays preferably have about 1200 $3/16$ inch diameter holes and a vent width of about 1 inch.

Figure 5:
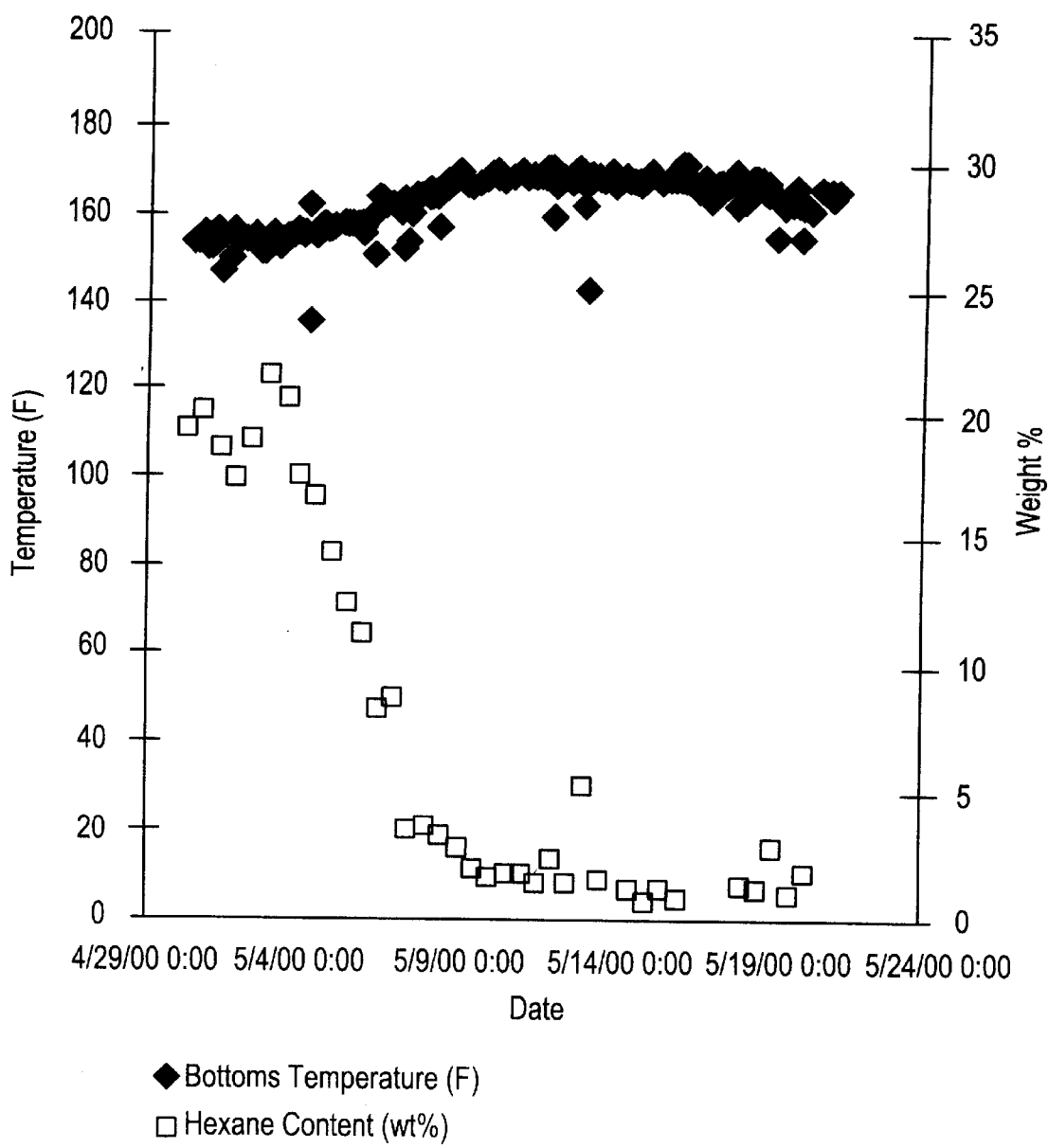
FIG. 5 illustrates a graph showing the weight percent of hexane remaining in the above mentioned column, after various time intervals and various temperatures.

Turning briefly to FIG. 5, illustrated is a graph showing the weight percent of hexane remaining in the above mentioned column 100, after various time intervals and various temperatures. As can be noticed by FIG. 5, the column 100 removes substantially all the hexane in a very efficient manner.

The larger holes in the bottom trays accommodate the more viscous rubber solution. The trays are designed to be easily removed from the column in the case of fouling. Also, a velocity breaker plate, to prevent liquid entrainment, may be installed over the vapor outlet, and a distribution nozzle may be used to feed the rubber solution to the column. Moreover, those who are skilled in the art understand that the specifications of the column can be adjusted for a large commercial application.

Figure 6:
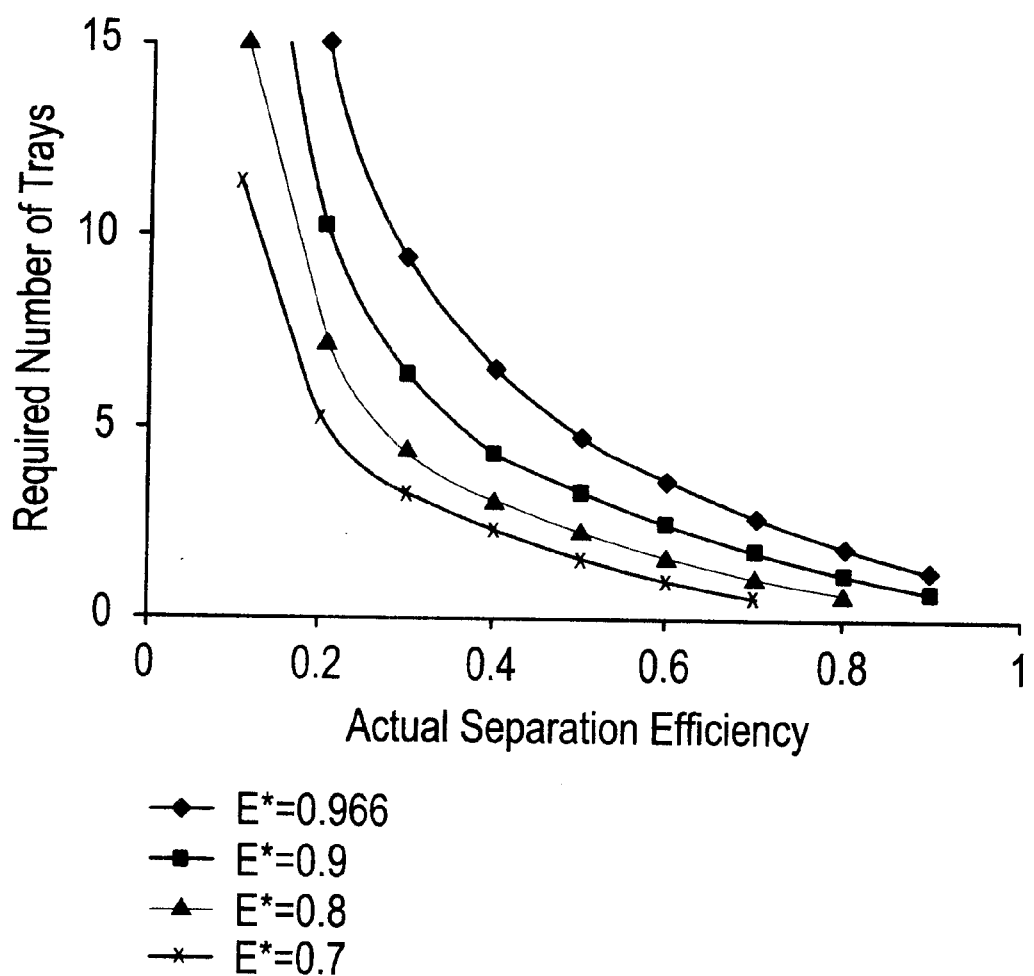
FIG. 6 illustrates how the number of exchange plates may depend on the actual separation efficiency needed.

It should also be understood that the number of exchange plates 120, spacing of such exchange plates and other similar features may be altered to maximize the separation efficiency. FIG. 6 illustrates how the separation efficiency varies with changing the above mentioned features. More specifically, FIG. 6 illustrates how the number of exchange plates 120 may depend on the actual separation efficiency needed. Because the viscosity increases in the bottom of the column, larger diameter holes may be used in the bottom of the column to limit the column size. Moreover, since there is less vapor flow at the bottom of the column, smaller vapor vents may be required at the bottom of the column.

In general, the solvent exchange column 100 is operated by passing a fluid, including a solvent, through holes 230 located in each of the exchange plates 120 in the above designed solvent exchange column 100. As mentioned earlier, the fluid may enter the solvent exchange column 100 through a nozzle (not shown) in the top dome 150 nor a pipe (not shown) in the upper portion of the external vessel. Regardless, the fluid should enter the solvent exchange column 100 above the top exchange plate. As the fluid enters the solvent exchange column 100 it may be subjected to a specified amount of heat, volatilizing a substantial portion of the solvent from the fluid. The amount of heat supplied may vary depending on the exchange plate and will generally increase as the fluid travels to the bottom of the solvent exchange column 100. For example, in an eight stage solvent exchange column 100 the temperature may vary from about 60° F. at the top stage to about 170° F. at the bottom stage; however, the present invention may use a wide range of temperatures and should not be limited to the temperatures previously mentioned. One having skill in the art understands the many ways to provide heat to the solvent exchange column 100, however, in one specific embodiment the solvent exchange column 100 is heated by a hot water reboiler which may be fed by a variable speed pump.

As the fluid is heated and passes through each of the exchange plates the high volatility solvent will flash off. As the solvent is heated, flashes and separates, a substantial portion of the solvent is vented through the vapor ventilation system 130 of the solvent exchange column 100. As mentioned earlier, in those embodiments where the vapor flow vents 140 form a part of the vapor ventilation system 130, it will vent through the vapor flow vents 140 located within the exchange plates or through the vapor flow vents 140 located adjacent a side of the exchange plates 120. As the fluid travels from the top exchange plate to the bottom exchange plate, more and more solvent is removed until a fluid containing a minimum desired amount of solvent is obtained. As mentioned above, the fluid may contain less than about 1% of the solvent.

The solvent exchange column 100 is believed to be useful for easily and inexpensively producing a suitable feed solution, which is commonly used to produce HIPS containing high-quality polybutadiene rubbers. Of equal importance, is the ability to do this without the need, or expense, of finishing the polybutadiene and then grinding and re-dissolving it in styrene to attain the end product, as required in the prior art. Moreover, the solvent exchange column 100 is much more efficient than prior art devolatizer designs. For example, energy costs account for a large portion of the operating cost of a commercial rubber plant. Heat is required to flash off hexane and styrene in the solvent exchange column. Enough heat must be supplied to each stage to heat the fluid to the stage's temperature and flash off volatiles. The total heat duty for the column is obtained by summing the heat duties for each tray. The total solvent exchange column heat duty of a column constructed in accordance with the principles of the present invention is about 12.2 MM BTU/hr. Where no styrene is flashed off, the solvent exchange may have a heat duty of about 8.8 MM BTU/hr as compared with other conventional designs where the commercial heat duty is about 24.5 MM BTU/hr.

Figure 7:
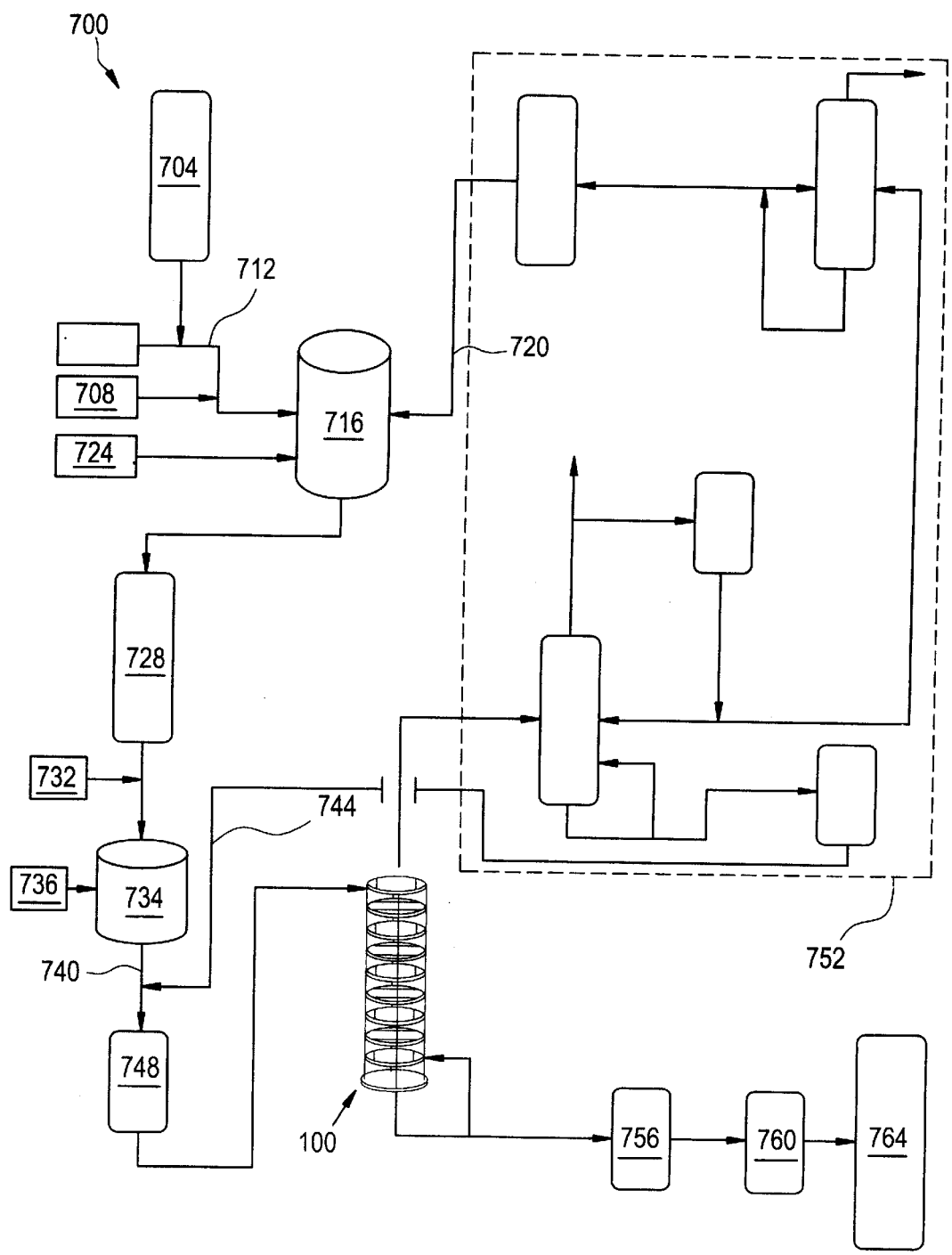
FIG. 7 illustrates a system for preparation of a rubber-modified vinyl aromatic polymer, which is one environment where the solvent exchange column may be used.

Turning to FIG. 7 with continued reference to FIGS. 1 & 2, illustrated is a system for preparation of a rubber-modified monovinyl aromatic polymer 700, which is one environment where the solvent exchange column 100 discussed above, may be used. The system may include a monomer storage tank 704 and an anti-gel inhibitor source 708. In one particularly advantageous embodiment, the monomer is butadiene. The monomer, received from the monomer storage tank 704 and minor effective amounts of a anti-gel inhibitor, received from the anti-gel inhibitor source 708, are desirably injected into a fluid line 712.

Once the anti-gel inhibitor and the monomer enter the fluid line 712, they mix and are carried to a reactor unit 716. Also entering the reactor unit 716, through a solvent line 720, is a solvent, such as a low boiling solvent having molecules containing from 4 to 6 carbon atoms. Particularly preferred solvents for use in the system 700 include n-hexane and n-butane. However, other low-boiling hydrocarbon solvents suitable for use in practicing the invention include pentane, isopentane and other similar low-boiling hydrocarbon solvents. It should also be noted that in a preferred embodiment, the solvent line 720 provides preheated solvent to the reactor unit 716. Also placed within the reactor unit 716, from an external source 724, is a conventional catalyst, such as n-butyl lithium. The reactor unit 716, in an exemplary embodiment, is a stirred, jacketed reactor having temperature and pressure monitors.

After the reactor unit 716 has performed its function, the fluid mixture exits through a discharge line in the bottom of the reactor and enters a plug flow reactor 728. The plug flow reactor 728 may be designed as a reactor for the polymerization of the remaining unreacted butadiene. In a preferred embodiment, the plug flow reactor 728 is sufficient to facilitate the production from about 9 to about 15 weight percent, and more preferably about 12 weight percent, polybutadiene in the fluid mixture. According to a particularly preferred embodiment, an antioxidant is metered from an antioxidant source 732, using any conventional or commercially available means, into a line exiting the plug flow reactor 728.

The fluid mixture then enters a blending tank 734, which blends a kill agent, provided by a kill agent source 736, and the fluid mixture. The kill agent is preferably designed to kill the conventional n-butyl lithium catalyst. After the fluid mixture exits the blending tank 734 via line 740, a vinyl aromatic monomer, preferably an unsaturated hydrocarbon having the general formula $C_nH_{2n-2}$, is introduced into the line 740 by a recycled solvent/monomer line 744. In a preferred embodiment, this unsaturated hydrocarbon is styrene. This produces a diluted monomer mixture. The recycled solvent/monomer line 744, as will be discussed in more detail below, provides a solvent/monomer that has been flashed from the fluid mixture by the solvent exchange column 100 and subsequently distilled and recycled. Thus, the present system 700 benefits from the ability to reuse any excess or flashed monomer/solvent.

The diluted monomer mixture is then preferably preheated in an exchanger 748. The exchanger 748 typically heats the diluted mixture to a preferred temperature prior to entering the solvent exchange column 100, similar to the solvent exchange column 100 discussed above and shown in FIG. 1. The solvent exchange column 100 operates as described above, wherein the solvent and a portion of the monomer are flashed off and exit through the vapor flow vents 140 located in their respective exchange plates 120. (All shown in FIG. 1).

The solvent and the portion of the styrene monomer that was flashed off may then be reclaimed by a vapor recovery system 752. The vapor recovery system 752 contains conventional separation and purification equipment (not shown) that separates the monomer from the solvent, and purifies each. The vapor recovery system 752 may then reroute the purified monomer to the recycled monomer line 744. Furthermore, the recycled solvent may be rerouted through the solvent line 720 to the reactor unit 716. Many operational details of the vapor recovery system, including many apparatuses used to purify and separate both the solvent and the monomer are omitted because they are well known to those who are skilled in the art.

The solution, typically a mixture of both polybutadiene and styrene, discharges from the bottom of the solvent exchange column 100 is preferably at least about 99% free of the solvent. The discharged solution then enters a buffer tank 756 and a test tank 760, prior to entering a styrene polymerization reactor 764. The discharged solution typically exits the polymerization reactor as HIPS. Some polybutadiene manufacturers have disclosed particular methods for improving production rates, reducing solvent requirements, and the like, by implementing other apparatus or procedures within the system described above. One having skill in the art understands that those apparatus not disclosed are also within the scope of the present invention. Thus, in no way is the present invention limited to the devices and structure disclosed herein. One having skill in the art understands that the solvent exchange column 100 could be implemented into any system where removal of a solvent is desired.

Although the present invention has been described in detail, those skilled in the art should understand that they can make various changes, substitutions and alterations herein without departing from the spirit and scope of the invention in its broadest form.

What is claimed is:

1. A solvent exchange column, comprising:
   an exchange plate support structure;
   spaced apart, exchange plates coupled to and supported by said exchange plate support structure, each of said exchange plates having holes located therein to allow a passage of fluid therethrough; and
   a vapor ventilation system having vapor flow vents located on opposite sides of each of said exchange plates and said vents associated with one of said exchange plates are positioned in an offset relationship with respect to said vents associated with an adjacently positioned exchange plate, said system extending through said solvent exchange column and configured to allow a passage of a volatilized substance therethrough.

2. The solvent exchange column as recited in claim 1 wherein said vapor flow vents are overflow ports for said fluid.

3. The solvent exchange column as recited in claim 1 wherein said exchange plates further include vapor flow vents forming a part of said plates and located on opposing sides of each of said exchange plates.

4. The solvent exchange column as recited in claim 3 wherein said exchange plates are vertically spaced apart.

5. The solvent exchange column as recited in claim 4 wherein said vapor flow vents are offset by about 90°.

6. The solvent exchange column as recited in claim 1 wherein said exchange plates are grouped to form a first solvent exchange region and a second solvent exchange region wherein at least a portion of said exchange plates that form said first solvent exchange region have a surface area greater than at least a portion of said exchange plates that form said second solvent exchange region.

7. The solvent exchange column as recited in claim 6 wherein said first solvent exchange region has a surface area greater than a surface area of said second solvent exchange region.

8. The solvent exchange column as recited in claim 1 wherein said exchange plates are configured to remove at least about 99% of a solvent from a fluid passed through said solvent exchange column.

9. A method of using a solvent exchange column, comprising:
   passing a fluid, including a solvent, through exchange plates of a solvent exchange column, said exchange plates having holes located therein to allow a passage of said fluid therethrough;
   volatilizing a portion of said solvent from said exchange plates; and
   venting a portion of said solvent through a vapor ventilation system of said solvent exchange column, said system having vapor flow vents located on opposite sides of each of said exchange plates and said vents associated with one of said exchange plates are positioned in an offset relationship with respect to said vents associated with an adjacently positioned exchange plate.

10. The method as recited in claim 9 further including overflowing an excess of said fluid through said vapor flow vents.

11. The method as recited in claim 9 wherein said venting said solvent includes venting said solvent through vapor flow vents located within opposing sides of each of said exchange plates. located within opposing sides each of said exchange plates.

12. The method as recited in claim 11 wherein venting a substantial portion of said solvent through a vapor ventilation system includes venting a substantial portion of said solvent through said vapor flow vents.

13. The method as recited in claim 12 wherein venting said solvent through vapor flow vents located within opposing sides of each of said exchange plates includes venting said solvent through exchange plates that are vertically spaced apart.

14. The method as recited in claim 12 wherein said vapor flow vents are offset by about 90°.

15. The method as recited in claim 9 wherein passing includes passing said fluid through a first solvent exchange region and a second solvent exchange region wherein at least a portion of said exchange plates that form said first solvent exchange region has a surface area greater than at least a portion of said exchange plates that form said second solvent exchange region.

16. The method as recited in claim 15 wherein passing a fluid through a first solvent exchange region includes passing a fluid through a first solvent exchange region that has a surface area greater than a surface area of said second solvent exchange region.

17. The method as recited in claim 9 wherein volatilizing a substantial portion of said solvent includes volatizing at least about 99% of a solvent from said fluid passed through said solvent exchange column.

18. The method as recited in claim 9 wherein passing a fluid includes passing a fluid comprising a monovinyl aromatic monomer and an unsaturated hydrocarbon polymer having the general formula $C_nH_{2n-2}$ and wherein said solvent is a hydrocarbon solvent having four to six carbon atoms per molecule.

19. The method as recited in claim 18 wherein said monovinyl aromatic monomer is a styrene monomer, said unsaturated hydrocarbon is a polybutadiene and said solvent is hexane.

20. The method as recited in claim 9 wherein volatilizing a substantial portion of said solvent includes applying heat to volatize a substantial portion of said solvent.

21. A system for preparation of a rubber-modified monovinyl aromatic polymer, comprising:
- a reactor for forming a mixture of a monovinyl aromatic monomer, an unsaturated hydrocarbon having the general formula $C_nH_{2n-2}$ and a solvent;
- a solvent exchange column fluidly coupled to said reactor and including:
  - an exchange plate support structure;
  - spaced apart, exchange plates coupled to and supported by said exchange plate support structure, each of said exchange plates having holes located therein to allow a passage of fluid therethrough; and
  - a vapor ventilation system having vapor flow vents located on opposite sides of each of said exchange plates and said vents associated with one of said exchange plates are positioned in an offset relationship with respect to said vents associated with an adjacently positioned exchange plate; and
- a styrene polymerization reactor fluidly coupled to said solvent exchange column.

22. The system as recited in claim 21 further including a recovery system fluidly coupled to said vapor ventilation system.

23. The system as recited in claim 21 wherein said exchange plates further include vapor flow vents forming a part of said plates and located on opposing sides of each of said exchange plates.

24. The system as recited in claim 23 wherein said vapor ventilation system includes said vapor flow vents.

25. The system as recited in claim 21 wherein said vapor flow vents are offset by about 90°.

26. The system as recited in claim 21 wherein said exchange plates are grouped to form a first solvent exchange region and a second solvent exchange region wherein at least a portion of said exchange plates that form said first solvent exchange region have a surface area greater than at least a portion of said exchange plates that form said second solvent exchange region.

27. The system as recited in claim 26 wherein said first solvent exchange region has a surface area greater than a surface area of said second solvent exchange region.

28. The system as recited in claim 21 wherein said exchange plates are configured to remove at least about 99% of a solvent from a fluid passed through said solvent exchange column.

* * * * *

UNITED STATES PATENT AND TRADEMARK OFFICE
CERTIFICATE OF CORRECTION

PATENT NO. : 6,471,865 B1
DATED : October 29, 2002
INVENTOR(S) : J. Todd Reaves et al.

It is certified that error appears in the above-identified patent and that said Letters Patent is hereby corrected as shown below:

Column 10,
Lines 50 through 54, claim 11 should read:

-- 11. The method as recited in claim 9 wherein said venting said solvent includes venting said solvent through vapor flow vents located within opposing sides of each of said exchange plates. --

Signed and Sealed this

Ninth Day of September, 2003

JAMES E. ROGAN
*Director of the United States Patent and Trademark Office*